(12) United States Patent
Tsukagoshi et al.

(10) Patent No.: US 8,763,585 B2
(45) Date of Patent: Jul. 1, 2014

(54) FUEL INJECTION APPARATUS FOR INTERNAL COMBUSTION ENGINE

(75) Inventors: Takahiro Tsukagoshi, Susono (JP); Fumito Chiba, Susono (JP); Mamoru Yoshioka, Susono (JP); Ryota Onoe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 13/257,686

(22) PCT Filed: Mar. 8, 2010

(86) PCT No.: PCT/JP2010/053770
§ 371 (c)(1),
(2), (4) Date: Sep. 20, 2011

(87) PCT Pub. No.: WO2011/111150
PCT Pub. Date: Sep. 15, 2011

(65) Prior Publication Data
US 2012/0318237 A1    Dec. 20, 2012

(51) Int. Cl.
*F02B 3/00*    (2006.01)

(52) U.S. Cl.
USPC ...... 123/299; 123/304; 123/575; 123/179.16; 701/103; 701/113

(58) Field of Classification Search
CPC . F02D 19/026; F02D 19/029; F02D 19/0605; F02D 19/0615; F02D 19/634; F02D 19/0639; F02D 19/0655; F02D 19/0671; F02D 19/0686; F02D 19/0689; F02D 19/0694; F02D 19/081; F02D 19/084; F02D 41/06; F02D 41/062; F02D 41/064; F02D 41/40; F02D 41/402

USPC ......... 123/1 A, 179.16, 179.3, 575, 576, 515, 123/513, 491, 476, 472, 304, 299; 701/103, 701/104, 105, 113; 239/533.1, 585.1

See application file for complete search history.

(56) References Cited

U.S. PATENT DOCUMENTS 4,424,771 A * 1/1984 Lovercheck .................. 123/3
5,051,244 A * 9/1991 Dunne et al. .................. 423/212

(Continued)

FOREIGN PATENT DOCUMENTS

JP    A-2008-88941    4/2008
JP    A-2008-106623   5/2008

(Continued)

OTHER PUBLICATIONS

International Search Report dated Apr. 6, 2010 in International Application No. PCT/JP2010/053770 (with translation).

*Primary Examiner* — Erick Solis
*Assistant Examiner* — Anthony L Bacon
(74) *Attorney, Agent, or Firm* — Oliff PLC (57) ABSTRACT

A fuel injection apparatus includes: an adsorbent disposed in an internal space of a leading end portion of a fuel injector, the adsorbent being capable of selectively adsorbing an alcohol component in the blended fuel of gasoline and alcohol; fuel pressure controller capable of achieving states in which a pressure of fuel to be supplied to the fuel injector is set to a low or high pressure range having a small or large adsorbed amount of alcohol on the adsorbent; and split injection controller that makes the fuel injector inject fuel for one cycle in a plurality of times, when the pressure of fuel to be supplied to the fuel injector is set to the high pressure range.

8 Claims, 8 Drawing Sheets

(56) References Cited

U.S. PATENT DOCUMENTS

| | | | |
|---|---|---|---|
| 5,132,020 A * | 7/1992 | Sorensen | 210/670 |
| 5,271,914 A * | 12/1993 | Sugimoto et al. | 95/141 |
| 8,118,009 B2 * | 2/2012 | Pursifull et al. | 123/434 |
| 8,312,867 B2 * | 11/2012 | Pursifull et al. | 123/516 |
| 8,459,238 B2 * | 6/2013 | Pursifull et al. | 123/516 |
| 2008/0092851 A1 * | 4/2008 | Arakawa et al. | 123/445 |
| 2008/0135015 A1 * | 6/2008 | Kapus | 123/299 |
| 2009/0159057 A1 * | 6/2009 | Pursifull et al. | 123/575 |

FOREIGN PATENT DOCUMENTS

| | | |
|---|---|---|
| JP | A-2008-248840 | 10/2008 |
| JP | A-2009-47055 | 3/2009 |

* cited by examiner

FUEL INJECTION APPARATUS FOR INTERNAL COMBUSTION ENGINE

TECHNICAL FIELD

The present invention relates to a fuel injection apparatus for an internal combustion engine.

BACKGROUND ART

Figure 10:
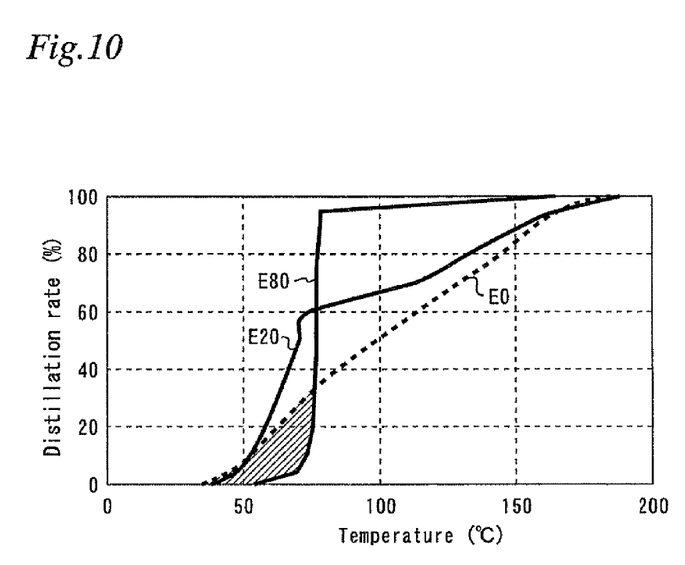
FIG. 10 is a chart showing a relationship between a distillation rate and a temperature of E80, E20, and E0.

A known internal combustion engine can use a blended fuel that is a mixture of gasoline and alcohol such as ethanol or methanol. FIG. 10 is a chart showing a relationship between a distillation rate and a temperature of E80 (a blended fuel with 80% ethanol), E20 (a blended fuel with 20% ethanol), and E0 (100% gasoline). Gasoline is composed of multiple components including one having a low boiling point which contributes to an outstanding vaporization characteristic even at low temperatures. Alcohol, on the other hand, is composed of a single component and thus has a fixed boiling point which is high (about 78° C. for ethanol). As is known from FIG. 10, therefore, a blended fuel having a high concentration of alcohol, such as E80, has a drawback that the fuel is extremely difficult to vaporize at temperatures lower than the boiling point of alcohol. Note that a blended fuel having a relatively low alcohol concentration, such as E20, may actually more readily vaporize than 100% gasoline because of azeotropic phenomenon.

For the reasons as described above, when a blended fuel having a high alcohol concentration is used, substantially only the gasoline component vaporizes of the blended fuel injected from a fuel injector during cold starting of the internal combustion engine, with very little of the alcohol component vaporizing. This results in an insufficient amount of vaporized fuel that contributes to combustion, thus posing a problem of tendency toward poor startability. In addition, the starting relies only on the gasoline component of the blended fuel injected, so that a large amount of fuel needs to be injected at starting in order to compensate for the insufficiency. An amount of alcohol component many times the amount of gasoline component that has contributed to combustion fails to vaporize and burn, flowing past a combustion chamber into an exhaust path in a form of HC. This results in a problem in that the amount of HC discharged into the atmosphere tends to be extremely large during cold starting.

JP-A-2008-248840 discloses an internal combustion engine having two fuel injectors for each cylinder. In the internal combustion engine, ethanol water is separated and extracted from a blended fuel of gasoline and ethanol accumulated in a fuel tank by adding water to the fuel tank; a residual fuel after the ethanol water is separated and extracted is injected from one fuel injector and the ethanol water is injected from the other fuel injector. The internal combustion engine, being able to inject only the residual fuel having a low ethanol concentration at starting, can solve the foregoing problem.

PRIOR ART DOCUMENTS

Patent Document

Patent Document 1: JP-A-2008-248840

SUMMARY OF THE INVENTION

Problems to be Solved by the Invention

The related art technique, however, requires two separate fuel supply systems, each including a fuel injector, a fuel path, and a fuel pump. This substantially doubles the cost, weight, and space requirements of the fuel supply systems, leading to a significantly increased cost, aggravated fuel economy due to the increased weight, and aggravated mountability. In addition, vehicle oscillations and acceleration during running help agitate the blended fuel in the fuel tank, which makes it difficult to separate gasoline from alcohol.

The present invention has been made to solve the foregoing problems and it is an object of the present invention to provide a fuel injection apparatus for an internal combustion engine using a blended fuel of gasoline and alcohol, the apparatus being capable of immediately reducing an alcohol concentration of fuel to be injected from a fuel injector of the internal combustion engine whenever necessary.

Means for Solving the Problem

First aspect of the present invention is a fuel injection apparatus for an internal combustion engine operable on a blended fuel of gasoline and alcohol, the apparatus comprising:

a fuel injector having a leading end portion that has an internal space in which fuel is pooled and an injection nozzle for injecting fuel;

an adsorbent disposed in the internal space, the adsorbent being capable of selectively adsorbing an alcohol component in the blended fuel, and having a property that an adsorbed amount of alcohol on the adsorbent is small when a fuel pressure is low and the adsorbed amount of alcohol is large when the fuel pressure is high;

fuel pressure control means capable of achieving a state in which a pressure of fuel to be supplied to the fuel injector is set to a low pressure range having a small adsorbed amount of alcohol on the adsorbent and a state in which the pressure of fuel to be supplied to the fuel injector is set to a high pressure range having a large adsorbed amount of alcohol on the adsorbent; and split injection control means for performing a split injection control that makes the fuel injector inject fuel for one cycle in a plurality of times, when the pressure of fuel to be supplied to the fuel injector is set to the high pressure range.

Second aspect of the present invention is the fuel injection apparatus for the internal combustion engine according to the first aspect, further comprising:

means for advancing injection start timing than when the fuel for one cycle is injected once when the split injection control is performed.

Third aspect of the present invention is the fuel injection apparatus for the internal combustion engine according to the first or the second aspect, further comprising:

means for determining whether to perform the split injection control or to inject the fuel for one cycle once based on an injection amount requirement when the pressure of fuel to be supplied to the fuel injector is set to the high pressure range.

Fourth aspect of the present invention is the fuel injection apparatus for the internal combustion engine according to any one of the first to the third aspects, further comprising:

means for correcting the fuel pressure to an even higher level than in the case in which the fuel for one cycle is injected once if the split injection control is to be performed, when the pressure of fuel to be supplied to the fuel injector is set to the high pressure range.

Fifth aspect of the present invention is the fuel injection apparatus for the internal combustion engine according to any one of the first to the fourth aspects, wherein: the split injection control means equalizes an injection amount in each injection split into the plurality of times.

Sixth aspect of the present invention is the fuel injection apparatus for the internal combustion engine according to any one of the first to the fifth aspects, further comprising:

means for determining whether or not there is a requirement for lowering an alcohol concentration of fuel to be injected from the fuel injector than that of the fuel supplied to the fuel injector; and means for letting the adsorbent adsorb alcohol by setting the pressure of the fuel to be supplied to the fuel injector to the high pressure range when it is determined that there is the requirement.

Seventh aspect of the present invention is the fuel injection apparatus for the internal combustion engine according to any one of the first to the sixth aspects, further comprising:

means for lowering the alcohol concentration of the fuel to be injected from the fuel injector than that of the fuel supplied to the fuel injector by setting the pressure of the fuel to be supplied to the fuel injector to the high pressure range during cold starting of the internal combustion engine.

Effects of the Invention

In the first aspect of the present invention, the alcohol concentration of the alcohol blended fuel can be reduced in an inside of the leading end portion of the fuel injector. The alcohol concentration of the fuel to be injected can therefore be reduced immediately whenever necessary (e.g. during cold starting). Since the first aspect of the present invention allows the foregoing effect to be achieved without having a fuel injector for use exclusively for alcohol, the fuel supply system can be simplified for reduction in cost and weight. When fuel is injected with the alcohol adsorbed onto the adsorbent at the leading end portion of the fuel injector, performance of the split injection allows the fuel pressure at the leading end of the injector to be properly inhibited from lowering during an injection period. This prevents the alcohol from being desorbed from the adsorbent during fuel injection even more reliably, so that the above effect can be exhibited even more remarkably.

The second aspect of the present invention allows completion of the fuel injection to fall reliably within required timing in the split injection.

The third aspect of the present invention allows necessity of performing the split injection to be determined appropriately.

The fourth aspect of the present invention allows completion of the fuel injection to fall within the required timing in the split injection even more reliably.

The fifth aspect of the present invention allows an injection period of each of split injection to be equally shortened, which even more reliably prevents the alcohol from being desorbed from the adsorbent during fuel injection.

In the sixth aspect of the present invention, if there is a requirement for lowering the alcohol concentration of the fuel to be injected from the fuel injector, fuel having a lowered alcohol concentration can be injected immediately in response to the requirement.

In the seventh aspect of the present invention, the alcohol concentration of the fuel to be injected from the fuel injector can be lowered during cold starting of the internal combustion engine. As a result, the amount of HC emissions discharged into the atmosphere can be reduced and startability can be improved.

MODE FOR CARRYING OUT THE INVENTION

Embodiments of the present invention will be described below with reference to the accompanying drawings. In each of the drawings, like or equal elements are identified by the same reference numerals and descriptions therefor will not to be duplicated.

First Embodiment

Figure 1:
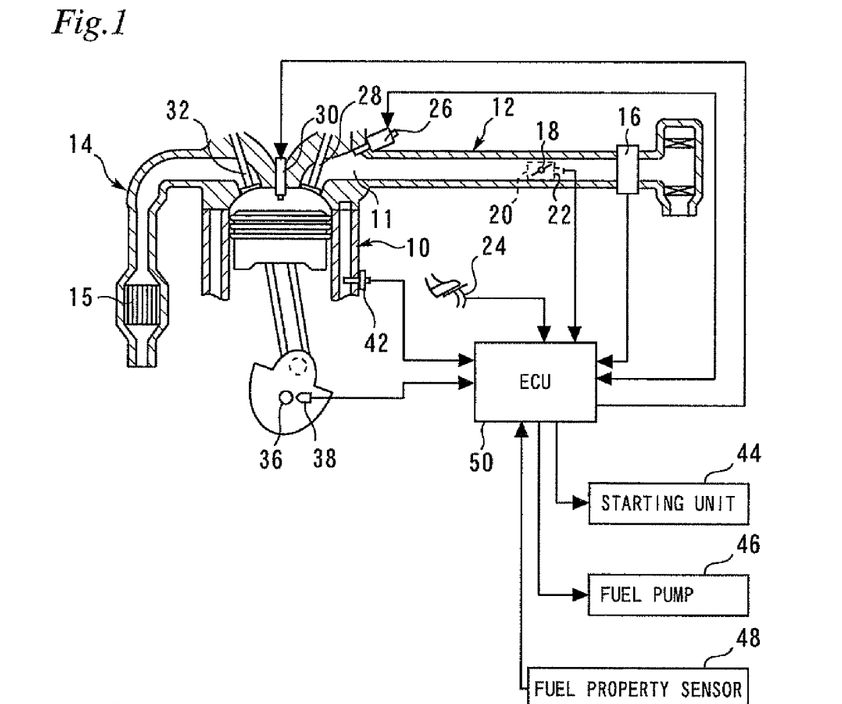
FIG. 1 shows the configuration of a system according to a first embodiment of the present invention.

FIG. 1 is a diagram for illustrating a system configuration of a first embodiment of the present invention. Referring to FIG. 1, the system according to this embodiment includes an internal combustion engine 10. The internal combustion engine 10 is used, for example, as a driving power source for a vehicle. The internal combustion engine 10 of this embodiment is an in-line four-cylinder type; however, the number and arrangement of cylinders of the internal combustion engine according to the present invention are not specifically limited. FIG. 1 is a cross-sectional view of a single cylinder of the internal combustion engine 10.

The internal combustion engine 10 is operable on not only gasoline, but also a fuel that is a mixture composed of gasoline and ethanol, methanol, or other type of alcohol (hereinafter referred to also as an "alcohol-blended fuel" or a "blended fuel"). In this case, the alcohol-blended fuel may range from one having a low concentration (e.g. about several percent) of an alcohol component (ratio of the alcohol component) to one having a high concentration (e.g. 80% or more).

The internal combustion engine 10 is connected with an intake path 12 and an exhaust path 14. An air flow meter 16 for detecting an intake air amount is disposed on the intake path 12. A throttle valve 18 is disposed downstream of the air flow meter 16. The throttle valve 18 has an opening adjusted by operation of a throttle motor 20. A throttle position sensor 22 for detecting the opening of the throttle valve 18 is disposed near the throttle valve 18. A catalyst 15 for purifying an exhaust gas is disposed on the exhaust path 14.

A fuel injector 26 for injecting fuel into an intake port 11 is disposed at each cylinder of the internal combustion engine 10. In addition, an intake valve 28, an ignition plug 30, and an exhaust valve 32 are disposed on each cylinder of the internal combustion engine 10.

A crank angle sensor 38 capable of detecting a rotational angle of a crankshaft 36 (crank angle) is disposed near the crankshaft 36 of the internal combustion engine 10. The crank angle sensor 38 can detect the crank angle and a speed of the internal combustion engine 10.

The system of this embodiment generally includes an accelerator position sensor 24, a coolant temperature sensor 42, a starting unit 44, a fuel pump 46, a fuel property sensor 48, and an ECU (electronic control unit) 50. Specifically, the accelerator position sensor 24 detects an amount of depression of an accelerator pedal on a driver's seat side of the vehicle on which the internal combustion engine 10 is mounted. The coolant temperature sensor 42 detects a coolant temperature of the internal combustion engine 10. The starting unit 44 includes a motor for rotatably driving the crankshaft 36 at starting of the internal combustion engine 10. Sensors and actuators of various types including the above are electrically connected to the ECU 50.

Figure 2:
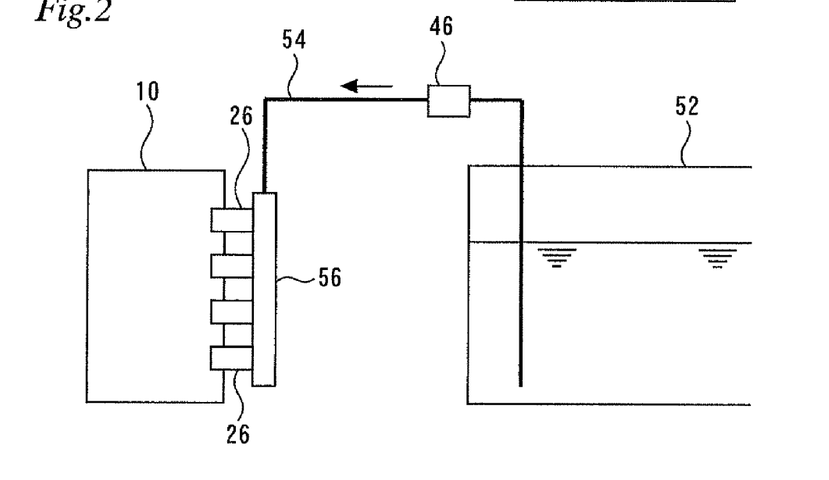
FIG. 2 is an illustration showing schematically a fuel system that supplies an internal combustion engine with fuel.

FIG. 2 is an illustration showing schematically a fuel system that supplies the internal combustion engine 10 with fuel. Referring to FIG. 2, the system of this embodiment includes a fuel tank 52. The fuel tank 52 is connected to a delivery pipe 56 via a fuel supply path 54. The fuel pump 46 that pressurizes fuel is disposed midway in the fuel supply path 54. This is, however, not the only possible location at which to dispose the fuel pump 46; rather, the fuel pump 46 may be disposed, for example, inside the fuel tank 52. Fuel accumulated in the fuel tank 52 is pressurized by the fuel pump 46 and sent to the delivery pipe 56 through the fuel supply path 54. The delivery pipe 56 distributes fuel to the fuel injector 26 of each cylinder. The fuel pump 46 is adapted to be able to send fuel to the delivery pipe 56 by regulating a fuel pressure to a value commanded by the ECU 50. Specifically, in the system of this embodiment, the fuel pressure inside the fuel injector 26 (specifically, a fuel injection pressure) is adjustable with the fuel pump 46.

Concentration of alcohol in fuel to be supplied to the fuel injector 26, specifically, fuel accumulated in the fuel tank 52 (hereinafter referred to as "in-tank fuel") increases or decreases according to the alcohol concentration of fuel selected for refueling by a user. In this embodiment, the alcohol concentration of the in-tank fuel can be detected by the fuel property sensor 48 disposed midway in the fuel supply path 54. For the fuel property sensor 48, a type of sensor may be used that detects the alcohol concentration by, for example, measuring dielectric constant or refractive index of the fuel. The position at which the fuel property sensor 48 is disposed in the figure is not the only possible arrangement. For example, the fuel property sensor 48 may be disposed in the fuel tank 52 or on the delivery pipe 56. Further, in the present invention, the method for detecting the alcohol concentration of the in-tank fuel is not limited to one using the fuel property sensor 48. For example, the alcohol concentration of the fuel may be detected (estimated) from a learned value in an air-fuel ratio feedback control. Specifically, the gasoline and the alcohol have different stoichiometric air-fuel ratio values, so that the stoichiometric air-fuel ratio value of the alcohol-blended fuel varies depending on the alcohol concentration. This allows the alcohol concentration of the in-tank fuel to be detected (estimated) based on the stoichiometric air-fuel ratio value learned using a signal fed back from an air-fuel ratio sensor (not shown) disposed in the exhaust path 14.

Figure 3:
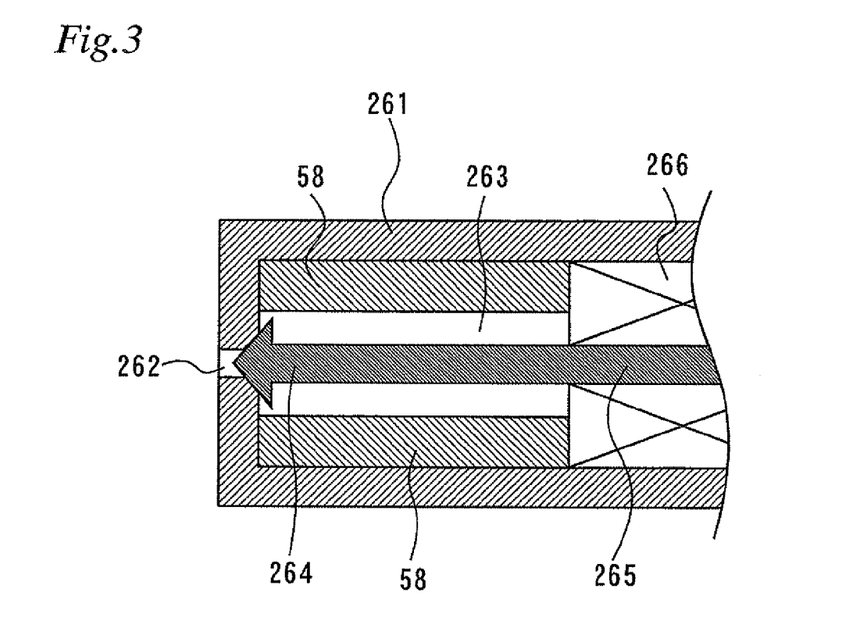
FIG. 3 is an enlarged cross-sectional view showing a leading end portion of a fuel injector.

FIG. 3 is an enlarged cross-sectional view showing a leading end portion of the fuel injector 26 included in the internal combustion engine 10 of this embodiment. Referring to FIG. 3, the fuel injector 26 has a leading end portion 261. The leading end portion 261 includes an injection nozzle 262 for injecting fuel and an internal space 263 in which fuel is pooled (filled with fuel). A needle valve 264 as an injection valve is passed through the internal space 263. The needle valve 264 opens and closes the injection nozzle 262. A plunger 265 is integrally formed on a proximal end side of the needle valve 264. A solenoid coil 266 is disposed around the plunger 265. When the solenoid coil 266 is energized, the plunger 265 is pulled in the solenoid coil 266, so that the plunger 265 and the needle valve 264 move to the proximal end side, which opens the injection nozzle 262. This allows fuel in the internal space 263 to be injected from the injection nozzle 262. When the solenoid coil 266 is de-energized, the plunger 265 and the needle valve 264 are brought back to their original positions by an urging force of a spring not shown. This closes the injection nozzle 262 to stop injection. Such a fuel pressure in the internal space 263 of the fuel injector 26 (hereinafter referred to also simply as the "fuel pressure") can be controlled to vary from low to high by a command issued from the ECU 50 to the fuel pump 56 as described earlier.

An adsorbent 58 is disposed in the internal space 263 at the leading end portion 261 of the fuel injector 26. According to the arrangement shown in the figure, the adsorbent 58 is disposed in a tubular form along an inner periphery of the internal space 263. Specifically, the adsorbent 58 is disposed so as to surround an outer peripheral side of the needle valve 264. A type having a property of selectively adsorbing the alcohol component in the alcohol-blended fuel is selected as the adsorbent 58. As a constituent material of such an adsorbent 58, a highly hydrophilic, porous body having fine pores on a molecule level that can take in alcohol molecules may be used; typically, zeolite is preferably used. Particularly preferably, a type of zeolite having a strong polarity is used. Use of the zeolite having the strong polarity allows alcohol molecules having a strong polarity to be reliably and selectively adsorbed from the fuel containing the gasoline component. Note also that, for example, pore size varies depending on a skeletal structure of the porous body used for the adsorbent 58 (for example, type A, type Y, and type X for zeolite). By selecting an optimum skeletal structure according to the size of the alcohol molecule in question, therefore, a favorable alcohol adsorption property can be obtained. To adsorb ethanol, for example, type A zeolite can be particularly preferably used.

The adsorbent 58 has a property that the amount of alcohol adsorbed onto the adsorbent 58 (hereinafter referred to as an "adsorbed amount of alcohol") is small when an ambient fuel pressure is low and the adsorbed amount of alcohol is large when the fuel pressure is high. The embodiment utilizes this property to control the adsorbed amount of alcohol on the adsorbent 58, thereby allowing the alcohol concentration of the fuel injected from the fuel injector 26 to be lower than that of the fuel supplied thereto (specifically, the in-tank fuel). Specifically, when the fuel pressure is increased from a low pressure state in which the adsorbed amount of alcohol is small to a high pressure state in which the adsorbed amount of alcohol is large, the alcohol component of the blended fuel resident in the internal space 263 is selectively adsorbed onto the adsorbent 58. This results in a decreased alcohol concentration of the blended fuel resident in the internal space 263, and an increased gasoline concentration thereof. By increasing the fuel pressure and injecting fuel from the fuel injector 26, therefore, the alcohol concentration of the fuel injected from the fuel injector 26 can be made lower than the alcohol concentration of the in-tank fuel.

The embodiment uses the foregoing function to control such that, during cold starting of the internal combustion engine 10, the alcohol concentration of the fuel to be injected from the fuel injector 26 is lower than that of the in-tank fuel. This allows fuel with a lower alcohol concentration and a higher gasoline concentration than the in-tank fuel (hereinafter referred to as an "alcohol concentration reduced fuel") to be injected from the fuel injector 26 during the cold starting, even if the alcohol concentration of the in-tank fuel is high. Good startability can therefore be obtained and a amount of HC emissions into the atmosphere can be reduced substantially.

In this apparatus, in particular, the alcohol concentration reduced fuel can be generated in the internal space 263 disposed immediately before the injection nozzle 262, which allows the alcohol concentration reduced fuel to be injected in the first injection sequence onward during starting. By contrast, in an arrangement in which the alcohol concentration reduced fuel is generated at a position before the fuel injector 26 (for example, the delivery pipe 56), the alcohol concentration reduced fuel can be injected only after the fuel injection sequence is repeatedly performed at least to replace the fuel in the fuel injector 26 with the alcohol concentration reduced fuel.

Being able to inject the alcohol concentration reduced fuel in the first injection sequence onward during starting is extremely effective in reducing the amount of HC emissions into the atmosphere for the following reasons. In the beginnings of cold starting, the catalyst 15 is yet to be warmed by the exhaust gas and remains inactive. As a result, most of HC discharged from the internal combustion engine 10 is discharged as it is into the atmosphere without being purified by the catalyst 15. When combustion thereafter starts in the internal combustion engine 10, the exhaust gas starts flowing into the catalyst 15 to thereby warm the catalyst 15, so that the catalyst 15 starts exhibiting catalytic activity, resulting in HC being purified by the catalyst 15. To reduce the amount of HC emissions into the atmosphere during cold starting, therefore, it is extremely important to reduce the amount of HC discharged from the internal combustion engine 10 for the first several cycles during which the catalyst 15 is yet to be warmed. In this respect, this apparatus can inject the alcohol concentration reduced fuel in the first injection sequence onward during starting, so that the amount of alcohol component flowing to the exhaust path 14 without being burned can be reliably reduced. Thus, the amount of HC emissions into the atmosphere during cold starting can be extremely effectively reduced.

When the adsorbed amount of alcohol on the adsorbent 58 is saturated, the adsorbent 58 can no longer adsorb alcohol. As a result, the alcohol concentration of fuel to be injected is brought back to the original level, specifically, the alcohol concentration of the in-tank fuel, through the process of repeated fuel injection sequences from the fuel injector 26 after the internal combustion engine 10 has been started. However, the catalyst 15 is warmed enough during the process to exhibit the activity, which starts purification of HC with the catalyst 15. Discharge of HC into the atmosphere can therefore be sufficiently inhibited. Meanwhile, the internal combustion engine 10 is also warmed during a period through which the alcohol concentration of fuel to be injected from the fuel injector 26 returns to the original level, which promotes vaporization of the alcohol component. Aggravation of driving stability of the internal combustion engine 10 after starting can therefore be sufficiently inhibited.

Figure 4:
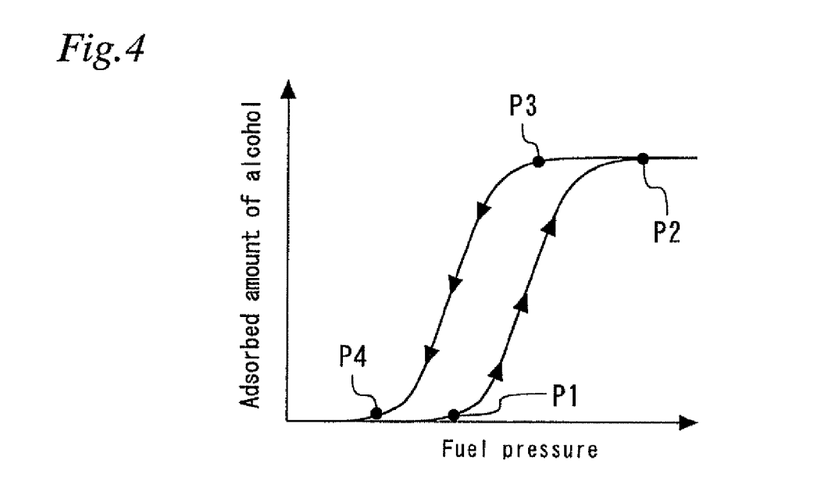
FIG. 4 is a graph showing a relationship between a fuel pressure and an adsorbed amount of alcohol on an adsorbent.

FIG. 4 is a graph showing a relationship between the fuel pressure and the adsorbed amount of alcohol on the adsorbent 58. As described earlier, the adsorbed amount of alcohol is small when the fuel pressure is low and large when the fuel pressure is high. Additionally, the adsorbed amount of alcohol has a hysteresis relative to a history of the fuel pressure as indicated by arrows affixed to curves in FIG. 4. Specifically, the curve on the right in FIG. 4 represents changes in the adsorbed amount of alcohol in a process of the adsorbent 58 adsorbing the alcohol when the fuel pressure is increased from a low pressure to a high pressure. The curve on the left in FIG. 4 represents changes in the adsorbed amount of alcohol in a process of the adsorbent 58 desorbing the adsorbed alcohol when the fuel pressure is decreased from a high pressure to a low pressure.

The ECU 50 can control adsorption of alcohol onto, or desorption of alcohol from, the adsorbent 58 by changing over a value of a set pressure of the fuel pump 46 between a low pressure and a high pressure to thereby vary the fuel pressure in the internal space 263 of the fuel injector 26. The adsorbed amount of alcohol onto the adsorbent 58 is saturated when the fuel pressure rises up to P2 in FIG. 4. Consequently, the fuel pressure is preferably set to more than P2 when the alcohol is to be adsorbed onto the adsorbent 58. This allows an alcohol adsorption ability of the adsorbent 58 to be fully extracted. Note, however, that alcohol can be adsorbed onto the adsorbent 58 with a fuel pressure of P1 or more in FIG. 4. To let alcohol be adsorbed onto the adsorbent 58, therefore, the fuel pressure has only to be increased to a value higher than at least P1.

When the fuel pressure is decreased from a condition in which the adsorbed amount of alcohol onto the adsorbent 58 is saturated, substantially no amount of alcohol is desorbed from the adsorbent 58 with a fuel pressure of up to P3 in FIG. 4. When the fuel pressure is lower than P3, desorption of alcohol from the adsorbent 58 is quickly started and, when the pressure is decreased to P4 in FIG. 4, the adsorbed amount of alcohol is substantially zero. To desorb alcohol from the adsorbent 58, therefore, the fuel pressure is preferably set to a value of P4 or lower. This allows a substantially whole amount of alcohol adsorbed onto the adsorbent 58 to be desorbed therefrom. Note, however, that the desorption of alcohol starts with a fuel pressure of P3 in FIG. 4 as described above. To let alcohol be desorbed from the adsorbent 58, therefore, the fuel pressure has only to be decreased down to a value less than at least P3.

In the description that follows, a range of fuel pressures in which the adsorbed amount of alcohol on the adsorbent 58 is small will be referred to as a "low pressure range" and a range of fuel pressures in which the adsorbed amount of alcohol on the adsorbent 58 is large as compared with that in the low pressure range will be referred to as a "high pressure range". Preferably, the low pressure range is a range of pressures at P1 or lower in FIG. 4, or may, instead, be a range on an even lower pressure side (e.g. a range of P4 or lower in FIG. 4). The high pressure range is a range of pressures at P3 or higher in FIG. 4, or may, instead, be a range on an even higher pressure side (e.g. a range of P2 or higher in FIG. 4).

Figure 5:
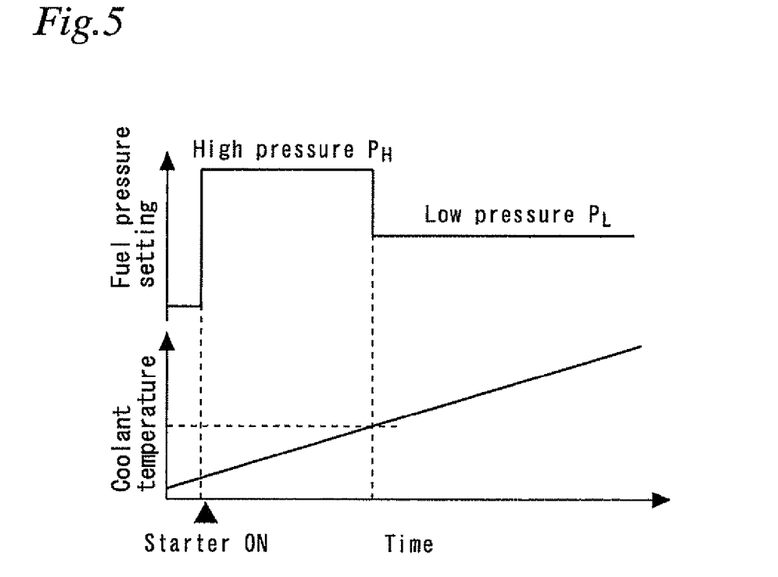
FIG. 5 is a graph for illustrating a fuel pressure control during cold starting of the internal combustion engine.

FIG. 5 is a graph for illustrating a fuel pressure control during cold starting of the internal combustion engine 10. As shown in FIG. 5, during the cold starting, the fuel pressure of the fuel pump 46 is set to a predetermined pressure $P_H$ that falls within the high pressure range. This allows the adsorbent 58 to adsorb alcohol, so that the fuel to be injected from the fuel injector 26 (hereinafter referred to as an "injected fuel") can have an alcohol concentration lower than that of the in-tank fuel. As described earlier, therefore, good startability can be obtained and a amount of HC emissions into the atmosphere can be reduced substantially.

After the cold starting, the fuel pressure setting for the fuel pump 46 is changed to a predetermined pressure $P_L$ that falls within the low pressure range when warm-up of the internal combustion engine 10 and the catalyst 15 have progressed to an extent. This allows the alcohol to be desorbed from the adsorbent 58, so that the adsorbent 58 recovers its alcohol adsorption ability to thereby prepare for the subsequent cold starting. The internal combustion engine 10 or the catalyst 15 can be determined whether the same is warmed or not with, for example, the coolant temperature. In the example shown in FIG. 5, therefore, after the cold starting, the fuel pressure setting for the fuel pump 46 is changed from the high pressure $P_H$ to the low pressure $P_L$ when the coolant temperature reaches a predetermined threshold value.

In a normal operating condition following completion of the warm-up of the internal combustion engine 10, desirably, the fuel pressure is, as a rule, set to a value in the low pressure range. The fuel pump 46 consumes more power at higher fuel pressures. In the normal operating condition, therefore, setting the fuel pressure to a value in the low pressure range allows the fuel pump 46 to consume less power. In a high speed and high load range, however, the fuel pressure may have to be set to a value in the high pressure range for meeting a requirement for a large amount of fuel to be injected within a short period of time.

Figure 6:
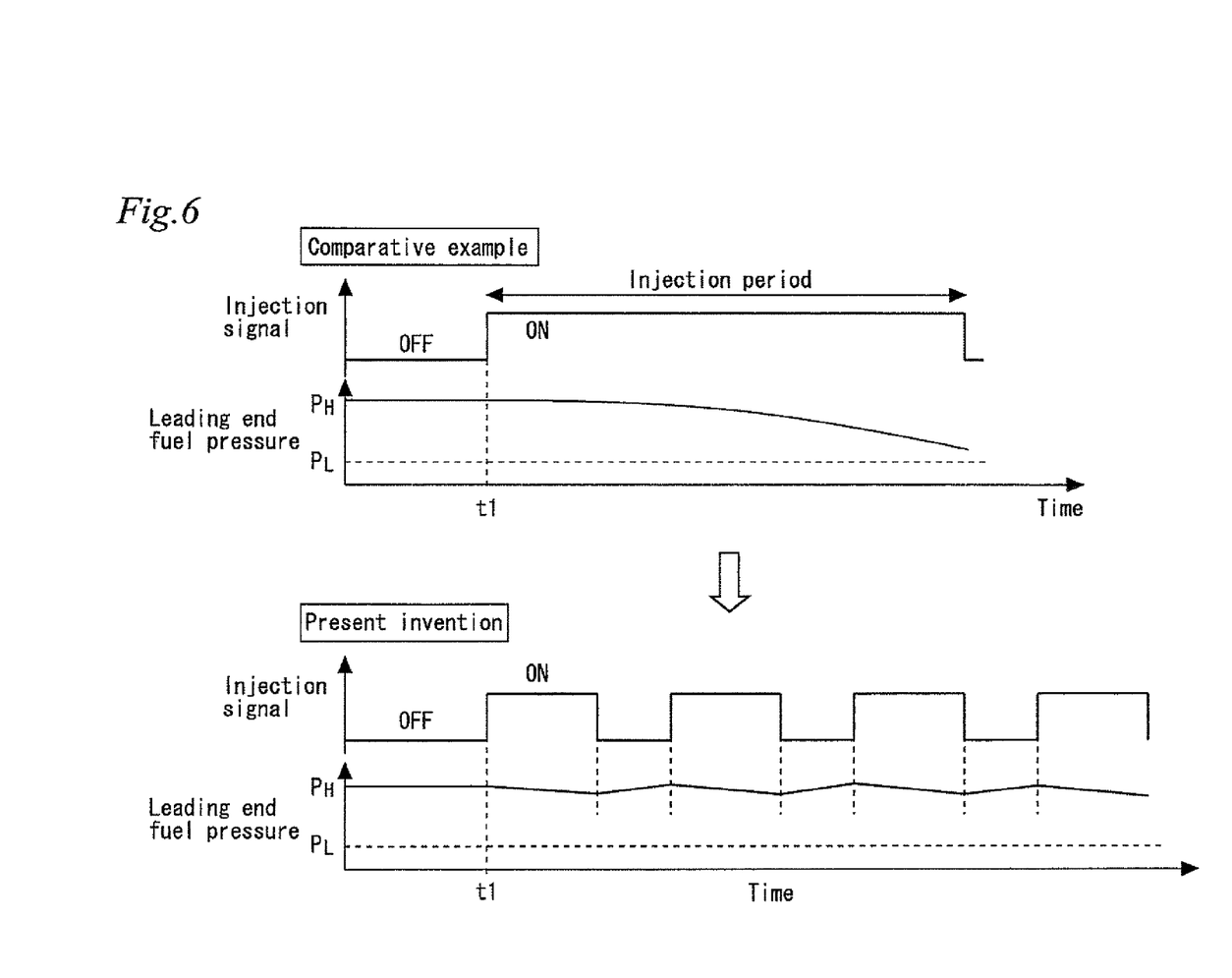
FIG. 6 is a graph showing changes with time in the fuel pressure in an internal space at the leading end portion of the fuel injector during high pressure fuel injection performed to adsorb alcohol onto the adsorbent.

FIG. 6 is a graph showing changes with time in the fuel pressure in the internal space 263 at the leading end portion 261 of the fuel injector 26 during high pressure fuel injection performed to adsorb alcohol onto the adsorbent 58. In the fuel injector 26, the needle valve 264 is lifted to open the injection nozzle 262 when an injection signal is turned ON, so that fuel is injected. The fuel injection amount varies depending on a period of time during which the injection nozzle 262 is open, specifically, a fuel injection period. In the internal combustion engine 10, typically, the injection signal is outputted according to the fuel injection period calculated based on an injection amount requirement. Fuel for one cycle is then injected once in a lump. Before the fuel injection is started (before time t1 in FIG. 6), the fuel pressure in the internal space 263 at the leading end portion 261 of the fuel injector 26 (hereinafter referred to as a "leading end fuel pressure") coincides with the set high pressure $P_H$. When the fuel injection is started, however, pressure is released through the open injection nozzle 262, so that the leading end fuel pressure gradually decreases. As shown in a graph of a "comparative example" shown on the upper side in FIG. 6, therefore, if the fuel injection period is long, the leading end fuel pressure significantly decreases to approach the low pressure $P_L$, which increases a likelihood that alcohol will be desorbed from the adsorbent 58.

To prevent the alcohol from being desorbed during high pressure fuel injection as described above, in this embodiment, the fuel for one cycle is injected in a plurality of times (four times in the example shown in the figure) as shown in a graph on the lower side of FIG. 6. Such split injection helps shorten the fuel injection period of each injection sequence, which prevents the leading end fuel pressure from decreasing significantly. Even if the leading end fuel pressure decreases a little during a split, short fuel injection period, the leading end fuel pressure is restored to the set high pressure $P_H$ during a pause period between two injection sequences in which the injection nozzle 262 closes. The leading end fuel pressure can therefore be reliably maintained at a level near the set high pressure $P_H$ until all fuel injection sequences are completed. The alcohol can therefore be reliably prevented from being desorbed from the adsorbent 58.

Figure 7:
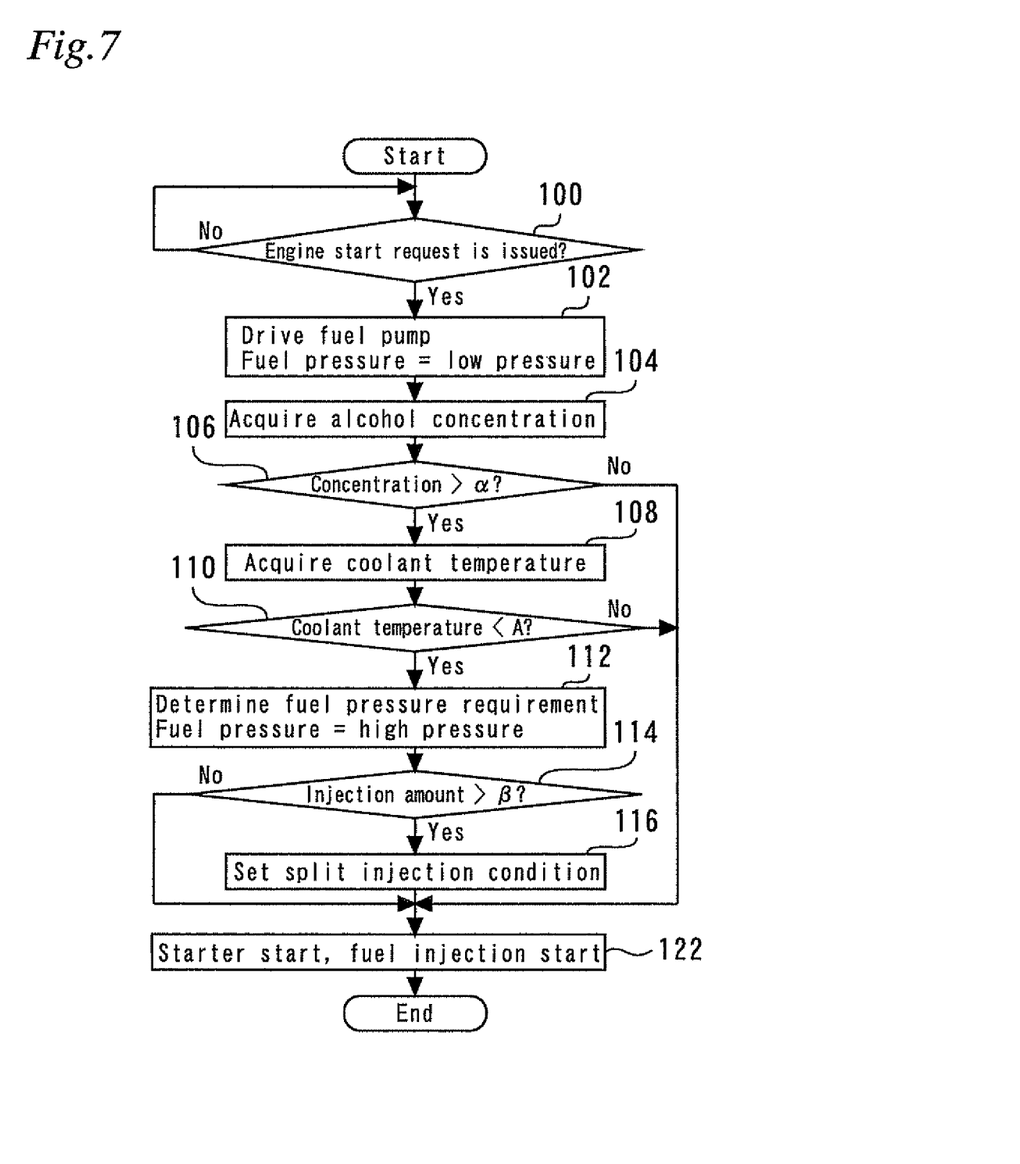
FIG. 7 is a flowchart illustrating a routine that is executed by the first embodiment of the present invention.

FIG. 7 is a flow chart showing a routine performed by the ECU 50 in this embodiment to achieve the above-described function. Referring to the routine shown in FIG. 7, it is first determined whether or not a request is issued for starting the internal combustion engine 10 (step 100). If the start request is issued, the fuel pump 46 is driven with the fuel pressure set to the low pressure $P_L$ (step 102). Next, the alcohol concentration of the in-tank fuel is acquired (step 104) and the alcohol concentration thus acquired is compared with a predetermined concentration a (step 106). If it is determined in step 106 that the alcohol concentration of the in-tank fuel is the predetermined concentration a or less, it is then determined that the cold starting with the alcohol concentration as is does not pose any problem in terms of startability or the amount of HC emissions into the atmosphere. In this case, therefore, the internal combustion engine 10 is started with the fuel pressure set at the low pressure $P_L$ (step 122). Specifically, in step 122, the starting unit 44 is driven and fuel injection from the fuel injector 26 is started. In this case, starting is performed without setting the fuel pressure to the high pressure $P_H$, which allows the fuel pump 46 to consume less power.

If it is determined in step 106 that the alcohol concentration of the in-tank fuel is higher than the predetermined concentration a, in contrast, the coolant temperature of the internal combustion engine 10 is next acquired (step 108) and the coolant temperature thus acquired is compared with a predetermined temperature A° C. (step 110). If it is determined in step 110 that the coolant temperature is the predetermined temperature A° C. or higher, it is then determined that the internal combustion engine 10 is warmed up and thus starting by injecting fuel with a high alcohol concentration does not pose any problem in terms of startability or the amount of HC emissions into the atmosphere. In this case, therefore, the internal combustion engine 10 is started with the fuel pressure set at the low pressure $P_L$ (step 122). In this case, too, starting is performed without setting the fuel pressure to the high pressure $P_H$, which allows the fuel pump 46 to consume less power.

In contrast, if it is determined in step 110 that the coolant temperature is lower than the predetermined temperature A° C., it is then determined that the internal combustion engine 10 is cold and thus, desirably, the alcohol concentration of the injected fuel during starting is brought to a level lower than the alcohol concentration of the in-tank fuel. In this case, therefore, the fuel pressure setting for the fuel pump 46 is changed to the high pressure $P_H$ to allow the adsorbent 58 to adsorb alcohol (step 112). Next, the injection amount requirement is compared with a predetermined value β (step 114). The predetermined value β is a threshold value for determining whether or not there is a need for split injection. If the injection amount requirement is equal to or less than the predetermined value β, it is determined that the amount of decrease in the leading end fuel pressure during the fuel injection period is small even if fuel is injected once in a lump and it is not likely that the alcohol will be desorbed from the adsorbent 58. In this case, therefore, the starting is performed through a single injection sequence for the injection amount requirement, and not through the split injection (step 122). In contrast, if the injection amount requirement exceeds the predetermined value β, it is determined that the split injection is required to prevent the alcohol from being desorbed from the adsorbent 58. In this case, a split injection condition is then set (step 116). Specifically, in step 116, the number of split injection sequences and the injection amount per one sequence are calculated by, for example, the following. For the injection amount per one sequence, an upper limit value is predetermined such that the amount of decrease in the leading end fuel pressure during the fuel injection period falls within a permissible range. The number of split injection sequences required can then be calculated by dividing the injection amount requirement by the upper limit value of the injection amount per one sequence and rounding up the result to the nearest whole number. The injection amount per split sequence may differ from one sequence to another, but desirably, is equal to each other. This is because of the following reason: if each split fuel injection period is equally shortened, the decrease in the leading end fuel pressure can be more minimal, which helps prevent the alcohol from being desorbed from the adsorbent 58 even more reliably. Accordingly, in step 116, it is desirable that the injection amount per one sequence be calculated by equally dividing the injection amount requirement by the number of split injection sequences. When the split injection condition is determined as described above, starting of the internal combustion engine 10 is performed (step 122). At this time, the fuel injector 26 is controlled based on the number of split injection sequences and the injection amount per one sequence calculated in step 116.

As described heretofore, in this embodiment, if a fuel with a high alcohol concentration is used, the alcohol concentration of the injected fuel can be made lower than the alcohol concentration of the in-tank fuel by setting the fuel pressure to the high pressure $P_H$ to thereby let the adsorbent 58 adsorb the alcohol during starting of the internal combustion engine 10. This achieves good startability and reliably reduces the amount of HC emissions into the atmosphere. Additionally, the split injection properly inhibits the leading end fuel pressure during the fuel injection period from decreasing. This prevents the alcohol from being desorbed from the adsorbent 58 during the fuel injection even more reliably, which allows the above effect to be exhibited even more remarkably.

It is to be noted that the adsorbed amount of alcohol on the adsorbent 58 when the fuel pressure is set to the high pressure $P_H$ in step 112 can be calculated based on the fuel pressure $P_H$ by storing a map as shown in FIG. 4 in the ECU 50 in advance. In this case, the alcohol concentration of the fuel in the internal space 263 after alcohol adsorption (specifically, the alcohol concentration of the injected fuel) can be calculated based on the adsorbed amount of alcohol, the alcohol concentration of the original fuel (specifically, the alcohol concentration of the in-tank fuel), and an effective volume of the internal space 263.

If the alcohol is adsorbed onto the adsorbent 58, preferably the fuel injection amount is to be corrected based on the alcohol concentration of the injected fuel for the following reason. The alcohol has a stoichiometric air-fuel ratio lower than that of the gasoline. Consequently, the stoichiometric air-fuel ratio of the blended fuel is lower at higher alcohol concentrations. To obtain a mixture of the stoichiometric air-fuel ratio, therefore, a correction needs to be made to increase the fuel injection amount (volumetric quantity) more for fuels having higher alcohol concentrations. This correction is typically made based on the alcohol concentration of the in-tank fuel. If the alcohol is adsorbed onto the adsorbent 58, this correction may be made based on the alcohol concentration of the injected fuel calculated as described above.

When the engine temperature is low (e.g. 25° C. or less), substantially no vaporization of the alcohol component of the blended fuel can be expected, which makes it necessary to generate the mixture having a required air-fuel ratio substantially only with the gasoline component of the blended fuel. At low temperatures, therefore, a correction is made to increase the fuel injection amount more for fuels having higher alcohol concentrations. This correction is typically made based on the alcohol concentration of the in-tank fuel. When the alcohol is adsorbed onto the adsorbent 58, the correction may be made based on the alcohol concentration of the injected fuel calculated as described above.

The embodiment has been described that the control is performed, during starting of the internal combustion engine 10, to make the alcohol concentration of the injected fuel lower than the alcohol concentration of the in-tank fuel by letting the adsorbent 58 adsorb the alcohol. In the present invention, however, such a control may be performed as necessary during operation of the internal combustion engine 10.

In the first embodiment described above, the fuel pump 46 corresponds to the "fuel pressure control means" in the first aspect of the present invention and the cold starting of the internal combustion engine 10 corresponds to the "requirement" in the sixth aspect of the present invention. Performance of step 116 by the ECU 50 achieves the "split injection control means" in the first aspect of the present invention.

Second Embodiment

A second embodiment of the present invention will be described below with reference to FIGS. 8 and 9. Differences from the first embodiment described above will be mainly described and descriptions of similarities will be simplified or omitted.

Figure 8:
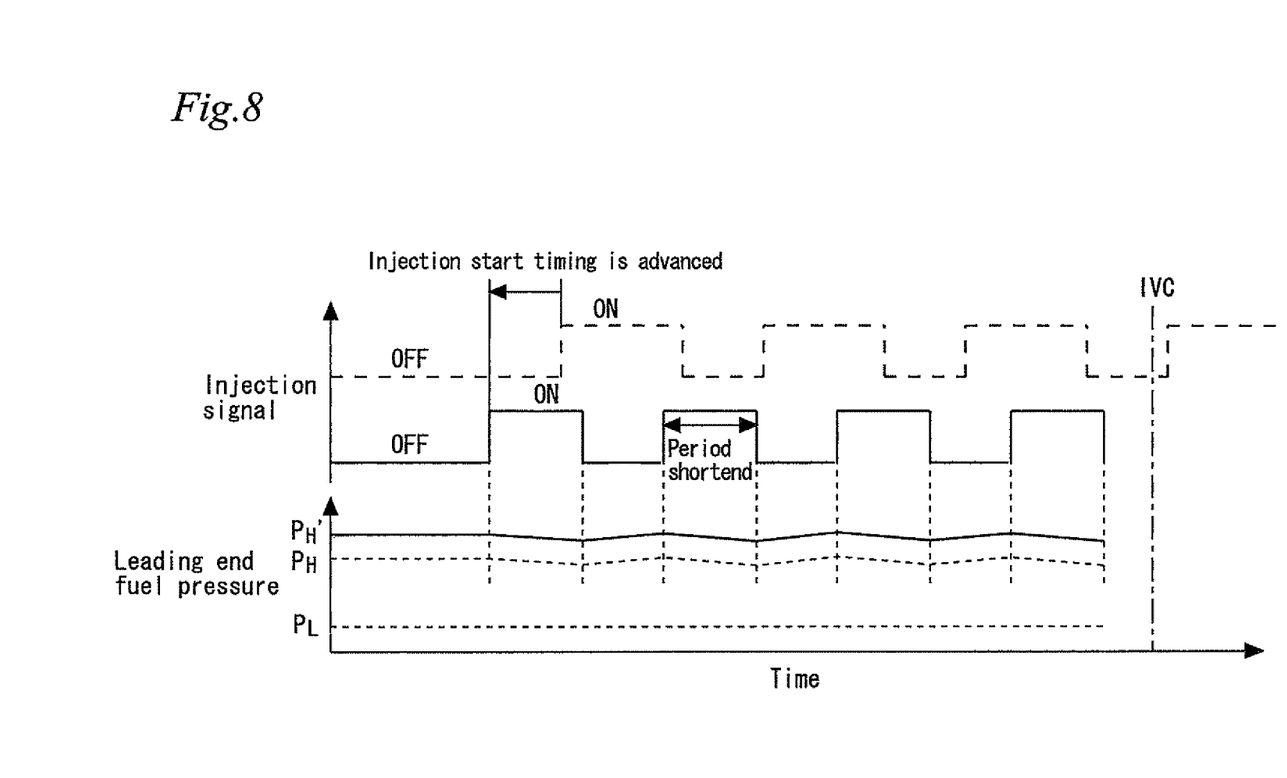
FIG. 8 is a graph showing an injection signal and changes in a leading end fuel pressure during performance of a split injection.

FIG. 8 is a graph showing the injection signal and changes in the leading end fuel pressure during performance of the split injection. In FIG. 8, the injection signal shown by a broken line is the same as that of the first embodiment described earlier and the injection signal shown by a solid line represents that of the second embodiment. If the split injection is performed, a pause period is inserted between two split injection periods, so that time it takes to complete entire fuel injection sequences is long as compared with a case of one injection sequence. With a port injection system as in the internal combustion engine 10 shown in FIG. 1, no fuel can enter the combustion chamber after the intake valve 28 closes, so that the fuel injection needs to be completed at least before the intake valve 28 closes. In the split injection, particularly if the injection amount requirement is large or intake valve 28 closing timing (IVC) is advanced by a variable valve timing mechanism, the fuel injection may not be completed before the IVC as shown by the injection signal shown by the broken line in FIG. 8. To avoid such situations, in this embodiment, injection start timing is advanced earlier than usual if the split injection is to be performed. In addition, in this embodiment, the fuel pressure setting is corrected to a pressure $P_H'$ that is even higher than the predetermined high pressure $P_H$, if the split injection is to be performed. The higher the fuel pressure, the greater the injection amount per unit time. By making the fuel pressure higher, therefore, the fuel injection period required to meet the injection amount requirement can be shortened. The time it takes to complete entire fuel injection sequences can therefore be shortened as shown in FIG. 8. From the foregoing, the embodiment allows the completion of the fuel injection to fall reliably within required timing even in the split injection.

Figure 9:
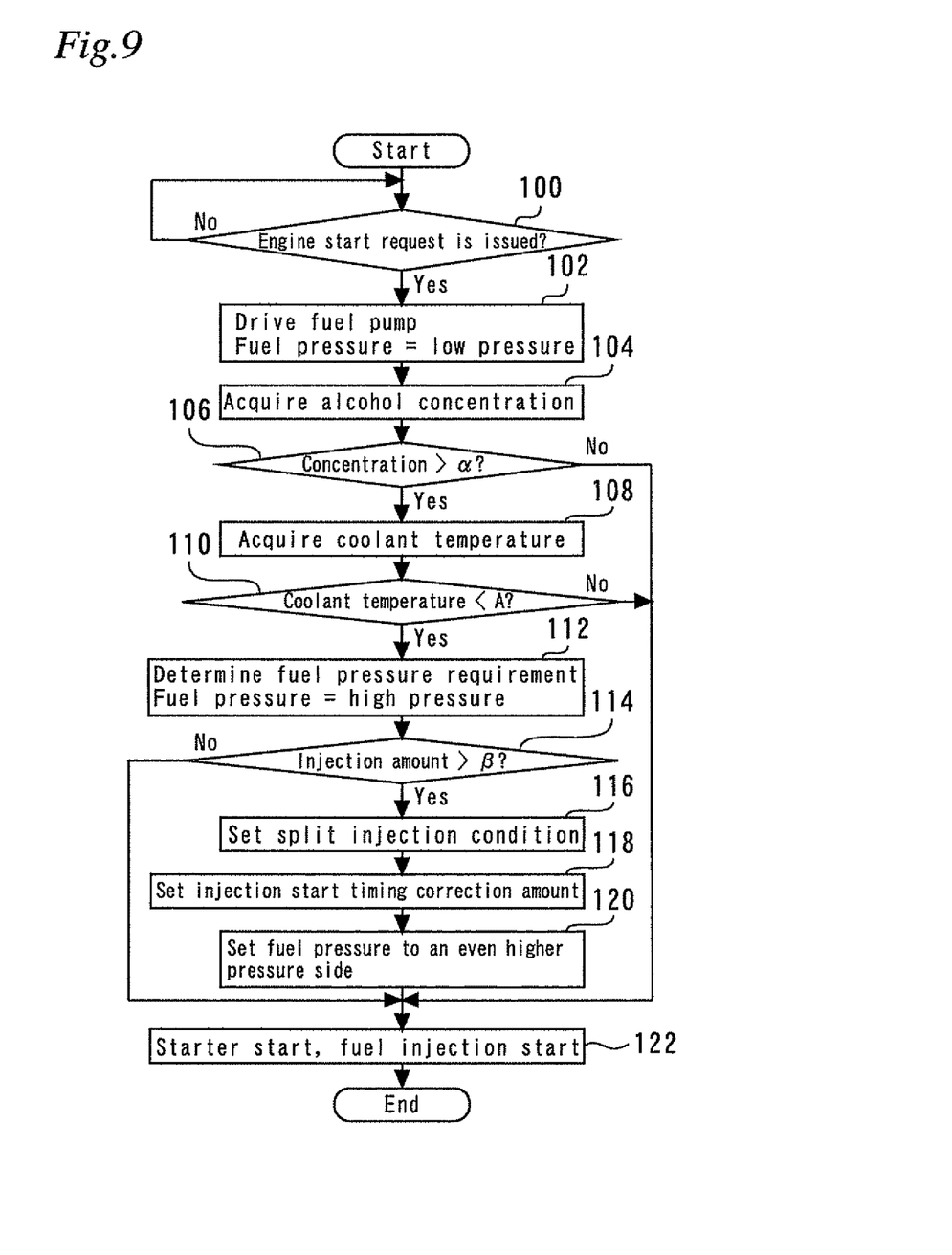
FIG. 9 is a flowchart illustrating a routine that is executed by a second embodiment of the present invention.

FIG. 9 is a flow chart showing a routine performed by the ECU 50 in this embodiment to achieve the above-described function. In FIG. 9, same steps as those of the routine shown in FIG. 7 are identified by like reference numerals and descriptions therefor are omitted. The routine shown in FIG.

9 is the same as that shown in FIG. 7 except that steps 118 and 120 are inserted between steps 116 and 122.

According to the routine shown in FIG. 9, if the split injection is to be performed, a correction amount for advancing the injection start timing is set (step 118) following setting of the split injection condition in step 116. In step 118, a predetermined value may be set for the correction amount for advancing the injection start timing, or a value may be set such that the correction amount for advancing is greater with greater injection amount requirements for one cycle. Next, the fuel pressure setting of the fuel pump 46 is corrected to an even higher pressure side (step 120). Specifically, in step 120, the fuel pressure setting is changed to the pressure $P_H'$ that is even higher than the high pressure $P_H$ set in step 112. The high pressure $P_H'$ after correction may be a predetermined value or calculated so as to be greater with greater injection amount requirements for one cycle. With the foregoing steps completed, starting of the internal combustion engine 10 is performed (step 122) based on the split injection condition set in steps 116, 118, and 120.

The embodiment described heretofore can allow the completion of the fuel injection to fall reliably within the required timing in the split injection, in particular, even when the injection amount requirement is large or the intake valve closing timing (IVC) is advanced.

With the internal combustion engine of the port injection system as in this embodiment, the fuel injection needs to be completed at the IVC. For an internal combustion engine of a cylinder injection system, the fuel injection may be completed at least before ignition timing.

Additionally, in this embodiment, if the fuel injection is completed within the required timing even if the fuel pressure is not corrected to the even higher pressure $P_H'$ when the split injection is to be performed, the split injection may be performed with the original high pressure $P_H$ without correction. Specifically, in this embodiment, the correction for advancing the injection start timing may only be made.

In the second embodiment described above, performance of step 118 by the ECU 50 achieves the "advancing means" in the second aspect of the present invention; performance of step 114 by the ECU 50 achieves the "determining means" in the third aspect of the present invention; and performance of step 120 by the ECU 50 achieves the "correcting means" in the fourth aspect of the present invention.

DESCRIPTION OF REFERENCE NUMERALS 10 internal combustion engine
11 intake port
12 intake path
14 exhaust path
15 catalyst
16 air flow meter
18 throttle valve
24 accelerator position sensor
26 fuel injector
261 leading end portion
262 injection nozzle
263 internal space
264 needle valve
265 plunger
266 solenoid coil
28 intake valve
30 ignition plug
32 exhaust valve
42 coolant temperature sensor
50 ECU
52 fuel tank
54 fuel supply path
56 delivery pipe
58 adsorbent

The invention claimed is:

1. A fuel injection apparatus for an internal combustion engine operable on a blended fuel of gasoline and alcohol, the apparatus comprising:
    a fuel injector having a leading end portion that has an internal space in which fuel is pooled and an injection nozzle for injecting fuel;
    an adsorbent disposed in the internal space, the adsorbent being capable of selectively adsorbing an alcohol component in the blended fuel, and having a property that an adsorbed amount of alcohol on the adsorbent is small when a fuel pressure is low and the adsorbed amount of alcohol is large when the fuel pressure is high;
    fuel pressure control means capable of achieving a state in which a pressure of fuel to be supplied to the fuel injector is set to a low pressure range having a small adsorbed amount of alcohol on the adsorbent and a state in which the pressure of fuel to be supplied to the fuel injector is set to a high pressure range having a large adsorbed amount of alcohol on the adsorbent; and
    split injection control means for performing a split injection control that makes the fuel injector inject fuel for one cycle in a plurality of times, when the pressure of fuel to be supplied to the fuel injector is set to the high pressure range.

2. The fuel injection apparatus for the internal combustion engine according to claim 1, further comprising:
    means for advancing injection start timing than when the fuel for one cycle is injected once when the split injection control is performed.

3. The fuel injection apparatus for the internal combustion engine according to claim 1, further comprising:
    means for determining whether to perform the split injection control or to inject the fuel for one cycle once based on an injection amount requirement when the pressure of fuel to be supplied to the fuel injector is set to the high pressure range.

4. The fuel injection apparatus for the internal combustion engine according claim 1, further comprising:
    means for correcting the fuel pressure to an even higher level than in the case in which the fuel for one cycle is injected once if the split injection control is to be performed, when the pressure of fuel to be supplied to the fuel injector is set to the high pressure range.

5. The fuel injection apparatus for the internal combustion engine according to claim 1,
    wherein: the split injection control means equalizes an injection amount in each injection split into the plurality of times.

6. The fuel injection apparatus for the internal combustion engine according to claim 1, further comprising:
    means for determining whether or not there is a requirement for lowering an alcohol concentration of fuel to be injected from the fuel injector than that of the fuel supplied to the fuel injector; and
    means for letting the adsorbent adsorb alcohol by setting the pressure of the fuel to be supplied to the fuel injector to the high pressure range when it is determined that there is the requirement.

7. The fuel injection apparatus for the internal combustion engine according to claim 1, further comprising:
    means for lowering the alcohol concentration of the fuel to be injected from the fuel injector than that of the fuel supplied to the fuel injector by setting the pressure of the fuel to be supplied to the fuel injector to the high pressure range during cold starting of the internal combustion engine.

8. A fuel injection apparatus for an internal combustion engine operable on a blended fuel of gasoline and alcohol, the apparatus comprising:

a fuel injector having a leading end portion that has an internal space in which fuel is pooled and an injection nozzle for injecting fuel;

an adsorbent disposed in the internal space, the adsorbent being capable of selectively adsorbing an alcohol component in the blended fuel, and having a property that an adsorbed amount of alcohol on the adsorbent is small when a fuel pressure is low and the adsorbed amount of alcohol is large when the fuel pressure is high;

a fuel pressure control device capable of achieving a state in which a pressure of fuel to be supplied to the fuel injector is set to a low pressure range having a small adsorbed amount of alcohol on the adsorbent and a state in which the pressure of fuel to be supplied to the fuel injector is set to a high pressure range having a large adsorbed amount of alcohol on the adsorbent; and a split injection control device for performing a split injection control that makes the fuel injector inject fuel for one cycle in a plurality of times, when the pressure of fuel to be supplied to the fuel injector is set to the high pressure range.

* * * * *